United States Patent [19]

Anezaki et al.

[11] Patent Number: 5,345,547
[45] Date of Patent: Sep. 6, 1994

[54] CONTOUR LINE CHARACTERISTIC POINT DETECTING APPARATUS

[75] Inventors: Takashi Anezaki, Hirakata; Kinji Horikami, Suita, both of Japan

[73] Assignee: Matsushita Electric Industrial Co., Ltd., Osaka, Japan

[21] Appl. No.: 902,373

[22] Filed: Jun. 23, 1992

[30] Foreign Application Priority Data

Jun. 27, 1991 [JP] Japan .................. 3-156616

[51] Int. Cl.⁵ .......................................... G06F 15/16
[52] U.S. Cl. ................... 395/143; 395/141
[58] Field of Search ............. 395/143, 141, 155, 161, 395/142; 340/747, 750, 706; 345/16, 17, 18, 135, 136

[56] References Cited

U.S. PATENT DOCUMENTS

| | | | |
|---|---|---|---|
| 4,905,166 | 2/1990 | Schuerman | 364/518 |
| 5,220,650 | 6/1993 | Barkans | 395/163 |
| 5,231,697 | 7/1993 | Yamada | 395/142 |

FOREIGN PATENT DOCUMENTS 02-8347 2/1990 Japan .

Primary Examiner—Phu K. Nguyen
Attorney, Agent, or Firm—Ratner & Prestia

[57] ABSTRACT

A contour line characteristic point detecting apparatus arranged so that direction codes of respective tracing points are obtained by contour line data, and then, their directional difference values are found by a directional difference value calculating part. Thus, permutational direction codes are obtained through addition of the directional difference value at the tracing point, to the direction code at the tracing starting point or to the permutational direction code at the previous tracing point by an adder. Thus, by inputting this permutational direction code into a calculation table through delay registers of a plurality of stages, the linear component detection and corner detection can be effected without depending on the directions.

2 Claims, 3 Drawing Sheets

Fig. 2

| No. | 1 | 2 | 3 | 4 | 5 | 6 |
|---|---|---|---|---|---|---|
| Direction of refraction | | | | | | |
| Angle of refraction | | | | | | |
| (g) | −1 | +1 | −2 | +2 | −3 | +3 |

Prior Art

CONTOUR LINE CHARACTERISTIC POINT DETECTING APPARATUS

BACKGROUND OF THE INVENTION

The present invention generally relates to a detecting apparatus, and more particularly, to a contour line characteristic point detecting apparatus for detecting an object by obtaining linear components and corners from contour line tracing data of an image in which edges of the object are represented by lines, in the case where position, attitude, and configuration, etc. of the object are to be found through processing of images picked up by a television camera and the like as in a so-called "robot-vision".

In recent years, the contour line characteristic point detecting method as referred to above has been widely employed for the "robot-vision", "machine-vision" or the like as an effective method for detecting an object.

Hereinbelow, referring to FIGS. 3 and 4, one example of the conventional contour line characteristic point detecting method as stated above will be explained.

FIG. 3 shows a contour line L of a binary image, a line image obtained by an edge detection or the like. For respective picture elements constituting such a contour line L, tracing numbers are written for convenience of explanation. Meanwhile, FIG. 4 shows direction code numbers to be used in the explanation. In other words, FIG. 4 shows directions of subsequent tracing picture elements in the picture elements to which attention is directed i.e. in the noticed picture elements, and at each 45° in the clockwise direction, with a horizontal leftward direction being set as 0, directions are indicated by numbers from 0 to 7. Table 1 given below represents steps for extracting linear portions by processing the contour lines shown in FIG. 3.

TABLE 1

| (a) Tracing No. | 1 | 2 | 3 | 4 | 5 | 6 | 7 |
|---|---|---|---|---|---|---|---|
| (b) Direction code | 5 | 4 | 4 | 5 | 4 | 4 | 5 |
| (c) Smoothing code | — | — | 22 | 21 | 22 | 22 | 21 |
| (d) Average value | — | — | 22 | 21.5 | 21.67 | 21.75 | 21.6 |
| (e) Average value difference (Absolute value) | — | — | 0 | 1 | 0.5 | 0.33 | 0.75 |
| (f) Linear label No. | — | — | ① | ① | ① | ① | ① |
| (a) | 8 | 9 | 10 | 11 | 12 | 13 | 14 | 15 |
| (b) | 4 | 4 | 5 | 4 | 4 | 5 | 6 | 6 |
| (c) | 22 | 22 | 21 | 22 | 24 | 25 | 28 | 30 |
| (d) | 21.67 | 21.71 | 21.63 | 21.67 | 24 | 24.5 | 28 | 30 |
| (e) | 0.4 | 0.33 | 0.71 | 0.37 | 2.33 | 1 | 3.5 | 2 |
| (f) | ① | ① | ① | ① | ② | ② | ③ | ④ |
| (a) | 16 | 17 | 18 | 19 | 20 | 21 | 22 | 23 |
| (b) | 7 | 6 | 6 | 7 | 6 | 6 | 7 | 6 |
| (c) | 31 | 32 | 32 | 32 | 32 | 32 | 31 | 32 |
| (d) | 30.5 | 32 | 32 | 32 | 32 | 32 | 31.83 | 31.86 |
| (e) | 1 | 1.5 | 0 | 0 | 0 | 0 | 1 | 0.17 |
| (f) | ④ | ⑤ | ⑤ | ⑤ | ⑤ | ⑤ | ⑤ | ⑤ |
| (a) | 24 | 25 | 26 | 27 | 28 | 29 | 30 | 31 |
| (b) | 6 | 7 | 0 | 0 | 7 | 0 | 0 | 7 |
| (c) | 26 | 19 | 20 | 14 | 7 | 14 | 14 | 7 |
| (d) | 26 | 19 | 19.5 | 14 | 7 | 14 | 14 | 7 |
| (e) | 5.86 | 7 | 1 | 5.5 | 7 | 7 | 0 | 7 |
| (f) | ⑥ | ⑦ | ⑦ | ⑧ | ⑨ | ①⓪ | ①⓪ | ①① |
| (a) | 32 | 33 | 34 | 35 | 36 | 37 | 38 | 39 |
| (b) | 0 | 0 | 7 | 0 | 0 | 7 | 0 | 0 |
| (c) | 14 | 14 | 7 | 14 | 14 | 7 | — | — |
| (d) | 14 | 14 | 7 | 14 | 14 | 7 | — | — |
| (e) | 7 | 0 | 7 | 7 | 0 | 7 | — | — |
| (f) | ①② | ①② | ①③ | ①④ | ①④ | ①⑤ | — | — |

In the above Table 1, there are provided columns for the tracing numbers (a), direction codes (b), smoothing codes (c), average values (d), average value differences (e), and linear label numbers (f). The smoothing code (c) is obtained through addition of some direction codes (b) before and after the noticed tracing number (a) and the direction code (b) at the noticed point, and here, the smoothing is effected by five tracing points, including two points before and after the noticed tracing number (referred to as the smoothing of tap numbers 5). The average value (d) is obtained by obtaining the total sum of the smoothing codes (c) of the respective tracing points before the noticed tracing point and judged to be of the same straight line and the smoothing code (c) of the noticed tracing point, and dividing the total sum by the number of the tracing points. The average value difference (e) represents the absolute value of the difference between the average value (d) at the tracing points before the noticed tracing point and the smoothing code (c) at the noticed tracing point. The linear label number (f) intends to form into a group, the tracing points regarded to be the same as a result of the linear judgement, in order to detect the linear component. Subsequently, a method of detecting a linear component "a" in FIG. 3 will be explained with reference to Table 1 referred to above. With respect to the tracing numbers 1 and 2, since part of the data to be smoothed is unknown at this time point, they are to be calculated later when the contour line is in a loop, and neglected when it is not in a loop. Thus, in the first place, a linear label number ① is given to the tracing number 3. Then, a difference between the smoothing code (c) at the tracing number 4 and the average value of the smoothing codes up to the tracing number 3 is obtained, and when the difference is small, the same linear label number ① as that for the tracing number 3 is given. Thereafter, in the similar manner as above, provided that there is not a large difference between the average value of the smoothing code (c) in the same linear label number prior to the noticed point and the smoothing code (c) at the noticed point, the same linear label number (f) is imparted, with the noticed point regarded as the same straight line. Specifically, in the above case, when the difference between the average value (d) and the smoothing code (c) is smaller than 1, it is regarded to be of the same straight line.

At the tracing number 12, since the average value difference is 2.33, thus exceeding 1, another linear label number ② is given and the average value is started to be newly calculated.

If the above result is regarded as the linear component when the number of the same linear label number exceeds a predetermined number, the linear component "a" is to be detected. In the similar manner, the linear component "b" is also detected as the linear label number ⑤.

The practice as described so far is disclosed, for example, in Japanese Patent Publication Tokkohei No. 2-8347 as a method of separating images according to modes.

In the above conventional method, however, if it is intended to detect the linear component "c" in FIG. 3, in the case where the direction codes are displaced between 0 and 7 as represented by the tracing numbers 27 to 37 in Table 1, the linear component can not be detected, since the correct smoothing code is not obtained due to formation of level difference therein.

Meanwhile, when the smoothing code is to be calculated by software, in order to avoid the problem as described above, there is such a practice that in the presence of displacement between 0 and 7 in the direction code data, the total sum is obtained after addition of the direction code dividing number 8 to the direction codes larger than 0 and smaller than 3, and remainder of dividing thereof by a value obtained through multiplication of the dividing number by the smoothing tap number (40 in the case where the tap number is 5), is used as the smoothing code. However, the above practice also has such disadvantages that the calculating time is increased, and upon realization thereof by hardware, the circuit scale becomes undesirably large.

Another main disadvantage inherent in the above practice is such that, in the case where filtering such as smoothing is to be effected by a comparatively large number of taps, correct result can not be obtained in the data in which the direction code turns by more than one round.

SUMMARY OF THE INVENTION

Accordingly, an essential object of the present invention is to provide a contour line characteristic point detecting apparatus, in which the direction code is converted so that a simple digital filter treatment (generally of calculation for sum of products) can be effected in the case where characteristics of straight lines and corners are to be detected by filtering the direction code, thereby to reduce calculating time and facilitate adoption of hardwares, with digital filter calculating portion being formed into a calculating table.

Another object of the present invention is to provide a contour line characteristic point detecting apparatus of the above described type, which is simple in construction and stable in functioning at high reliability, and can be readily manufactured at low cost.

In accomplishing these and other objects, according to one preferred embodiment of the present invention, there is provided a contour line characteristic point detecting apparatus which comprises means for obtaining a directional difference value which is a difference between a direction code of a contour line tracing point and another direction code of a next contour line tracing point adjacent thereto, means for obtaining a resultant permutational direction code by finding a permutational direction code through addition of the directional difference value to a direction code of the tracing starting point and by adding directional difference values calculated with respect to subsequent tracing points, to the permutational direction code at the previous contour line tracing point, a delay register means for delaying the permutational direction code successively obtained, by a desired number of stages, and a calculation table for receiving data from respective stages of the delay register means as address data, and outputting the result of calculation as output data, thereby to effect a linear component detection and a corner detection.

By the arrangement according to the present invention as described above, it is so arranged that the direction codes of the respective tracing points are obtained by the contour line data, and then, the directional difference values thereof are found, and thus, the permutational direction codes are obtained through addition of the directional difference value at the tracing point to the direction code at the tracing starting point or to the permutational direction code at the previous tracing point, and therefore, for example, in the case where the direction code starts from 7 and then, becomes 0, the permutational direction code is to be 8 by adding the directional difference value 1 to the direction code 7, thereby making it possible to form into the code without depending on the directions. Thus, by inputting this permutational direction code as the address data for the calculation table through the delay registers of a plurality of stages, the linear component detection and corner detection can be effected without depending on the directions, while reduction of calculating time is made possible. Moreover, since the arrangement of the present invention can be realized by simple hardwares, higher speed and cost reduction for the detection of objects may be achieved in the "robot-vision", "machine-vision", etc.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
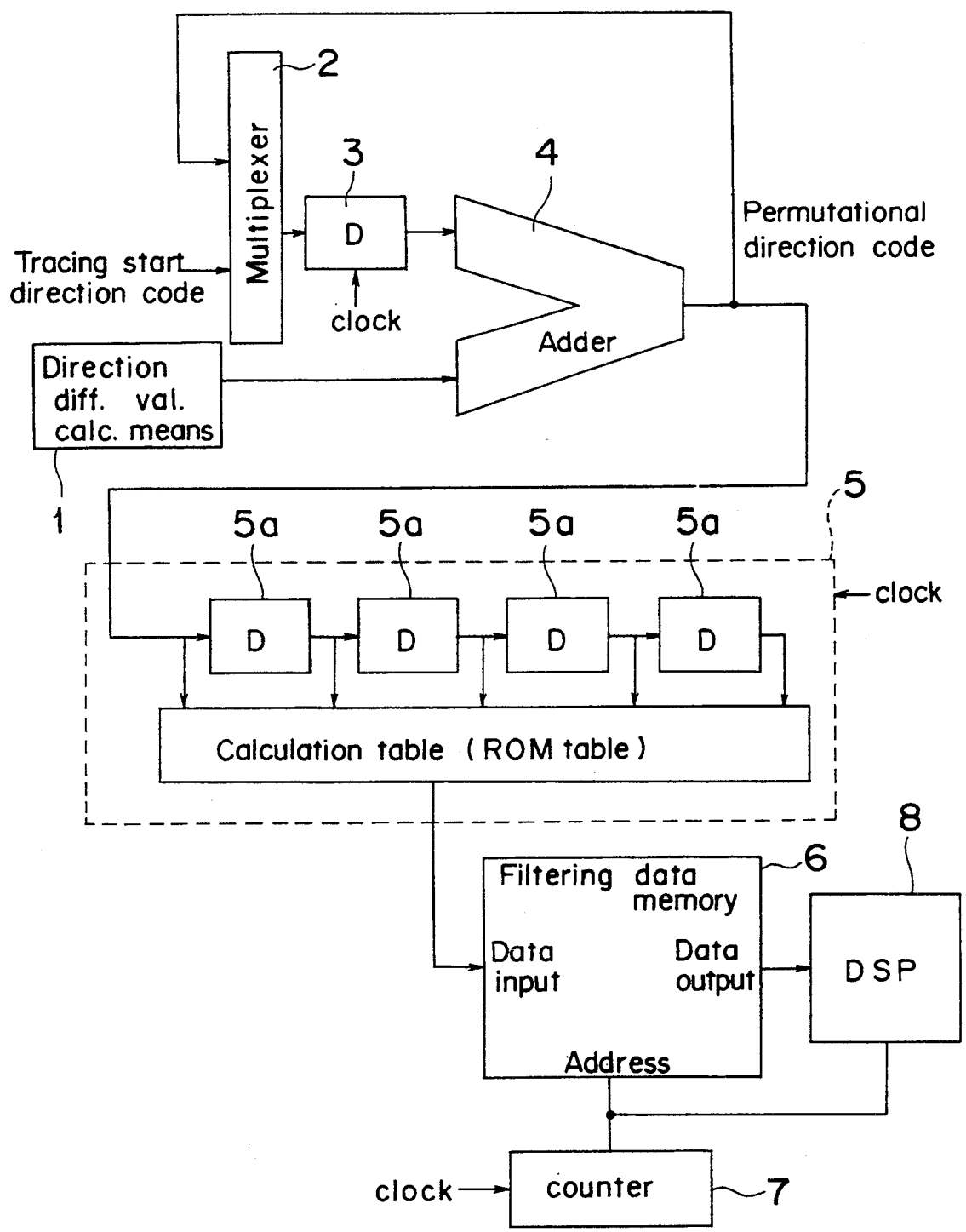
FIG. 1 is a block diagram showing construction of a contour line characteristic point detecting apparatus according to one preferred embodiment of the present invention, FIGS. 2(1) to 2(6) are diagrams for explaining determination of directional difference values.

Before the description of the present invention proceeds, it is to be noted that like parts are designated by like reference numerals throughout the accompanying drawings.

Figure 3:
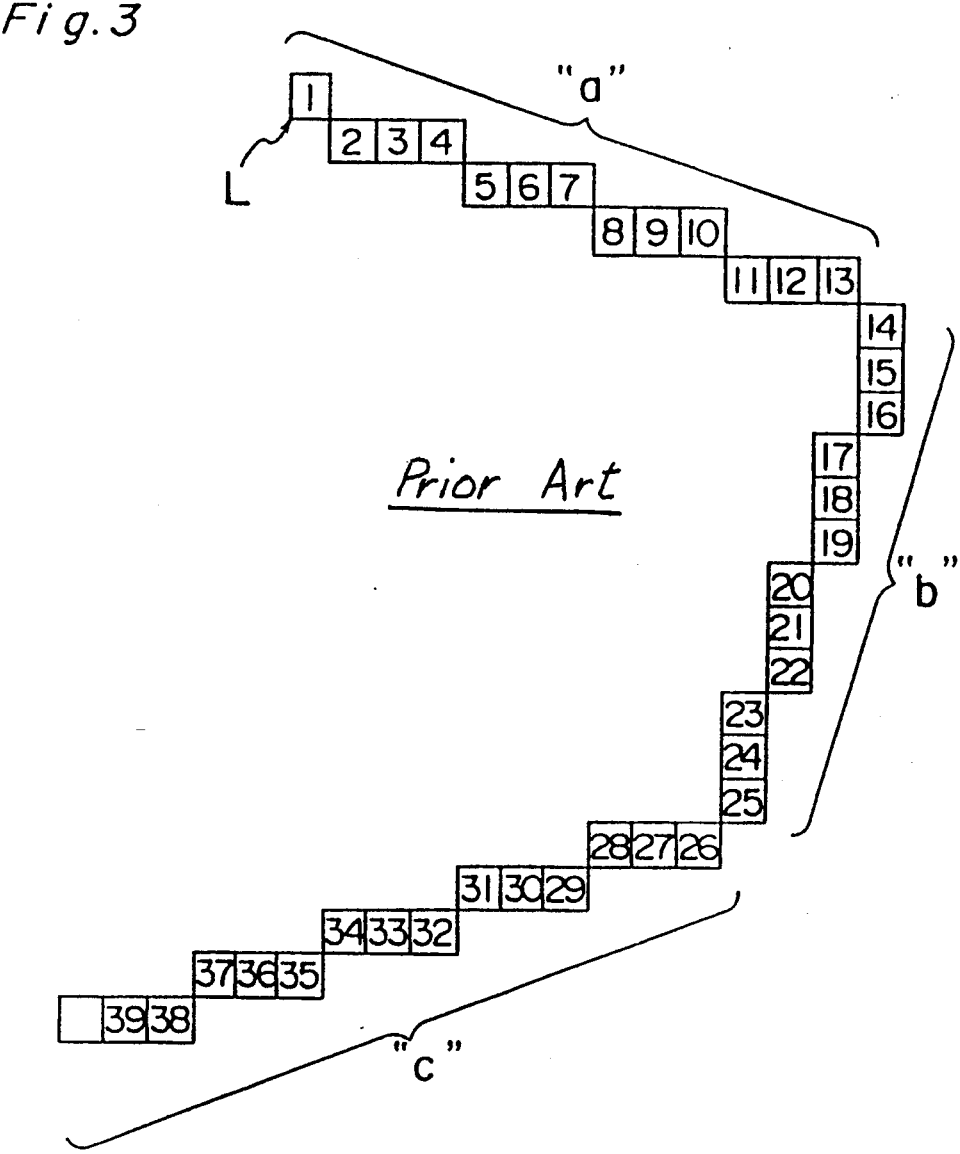
FIG. 3 is a diagram showing contour line data (already referred to)
Figure 4:
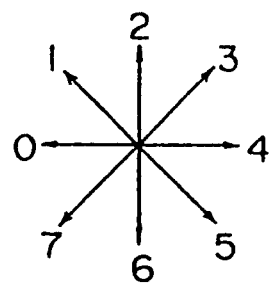
FIG. 4 is a diagram for explaining definition of the directional code (already referred to).

Referring now to the drawings, particularly to FIGS. 3 and 4, and Tables 2 and 3 given hereinbelow a contour line characteristic point detecting apparatus according to one preferred embodiment of the present invention will be described.

Table 2 shows a process for detecting linear components from the contour tracing data shown in FIG. 3 referred to earlier.

As stated earlier, FIG. 3 shows a contour line L of a binary image, a line image obtained by an edge detection or the like. For respective picture elements constituting such a contour line L, tracing numbers are written for convenience of explanation. Meanwhile, FIG. 4 shows direction code numbers to be used in the explanation. In other words, FIG. 4 shows directions of subsequent tracing picture elements in the picture elements to which attention is directed i.e. in the noticed picture elements, and at each 45° in the clockwise direction, with a horizontal leftward direction being set as 0, directions are indicated by numbers from 0 to 7. Table 2 given below represents steps for extracting linear portions by processing the contour lines shown in FIG. 3.

TABLE 2

| (a) Tracing No. | 1 | 2 | 3 | 4 | 5 | 6 | 7 |
|---|---|---|---|---|---|---|---|
| (b) Direction code | 5 | 4 | 4 | 5 | 4 | 4 | 5 |
| (g) Directional difference value | — | −1 | 0 | 1 | −1 | 0 | 1 |
| (h) Permutational direction code | 5 | 4 | 4 | 5 | 4 | 4 | 5 |
| (c) Smoothing code | — | — | 22 | 21 | 22 | 22 | 21 |
| (d) Average value | — | — | 22 | 21.5 | 21.67 | 21.75 | 21.6 |
| (e) Average value difference | — | — | 0 | 1 | 0.5 | 0.33 | 0.75 |
| (f) Linear label No. | — | — | ① | ① | ① | ① | ① |
| (a) | 8 | 9 | 10 | 11 | 12 | 13 | 14 | 15 |
| (b) | 4 | 4 | 5 | 4 | 4 | 5 | 6 | 6 |
| (g) | −1 | 0 | 1 | −1 | 0 | 1 | 1 | 0 |
| (h) | 4 | 4 | 5 | 4 | 4 | 5 | 6 | 6 |
| (c) | 22 | 22 | 21 | 22 | 24 | 25 | 28 | 30 |
| (d) | 21.67 | 21.71 | 21.63 | 21.67 | 24 | 24.5 | 28 | 30 |
| (e) | 0.4 | 0.33 | 0.71 | 0.37 | 2.33 | 1 | 3.5 | 2 |
| (f) | ① | ① | ① | ① | ② | ② | ③ | ④ |
| (a) | 16 | 17 | 18 | 19 | 20 | 21 | 22 | 23 |
| (b) | 7 | 6 | 6 | 7 | 6 | 6 | 7 | 6 |
| (g) | 1 | −1 | 0 | 1 | −1 | 0 | 1 | −1 |
| (h) | 7 | 6 | 6 | 7 | 6 | 6 | 7 | 6 |
| (c) | 31 | 32 | 32 | 32 | 32 | 32 | 31 | 32 |
| (d) | 30.5 | 32 | 32 | 32 | 32 | 32 | 31.83 | 31.86 |
| (e) | 1 | 1.5 | 0 | 0 | 0 | 0 | 1 | 0.17 |
| (f) | ④ | ⑤ | ⑤ | ⑤ | ⑤ | ⑤ | ⑤ | ⑤ |
| (a) | 24 | 25 | 26 | 27 | 28 | 29 | 30 | 31 |
| (b) | 6 | 7 | 0 | 0 | 7 | 0 | 0 | 7 |
| (g) | 0 | 1 | 1 | 0 | −1 | 1 | 0 | −1 |
| (h) | 6 | 7 | 8 | 8 | 7 | 8 | 8 | 7 |
| (c) | 34 | 35 | 36 | 38 | 39 | 38 | 38 | 39 |
| (d) | 34 | 34.5 | 36 | 38 | 38.5 | 38.33 | 38.25 | 38.4 |
| (e) | 2.14 | 1 | 1.5 | 2 | 1 | 0.5 | 0.25 | 0.75 |
| (f) | ⑥ | ⑥ | ⑦ | ⑧ | ⑧ | ⑧ | ⑧ | ⑧ |
| (a) | 32 | 33 | 34 | 35 | 36 | 37 | 38 | 39 |
| (b) | 0 | 0 | 7 | 0 | 0 | 7 | 0 | 0 |
| (g) | 1 | 0 | −1 | 1 | 0 | −1 | 1 | 0 |
| (h) | 8 | 8 | 7 | 8 | 8 | 7 | 8 | 8 |
| (c) | 38 | 38 | 39 | 38 | 38 | 39 | — | — |
| (d) | 38.33 | 38.29 | 38.38 | 38.33 | 38.3 | 38.36 | — | — |
| (e) | 0.4 | 0.33 | 0.71 | 0.38 | 0.33 | 0.7 | — | — |
| (f) | ⑧ | ⑧ | ⑧ | ⑧ | ⑧ | ⑧ | — | — |

Remarks: Average value difference is in absolute value.

In Table 2, there are provided columns for the tracing numbers (a), direction codes (b), directional difference values (g), permutational direction codes (h), smoothing codes (c) average values (d), average value difference (e), and linear label numbers (f). The smoothing code (c) is obtained through addition of some direction codes (b) before and after the noticed tracing number (a) and the direction code (b) at the noticed point, and here, the smoothing is effected by five tracing points, including two points before and after the noticed tracing number (referred to as the smoothing of tap number 5). The average value (d) is obtained by obtaining the total sum of the smoothing codes (c) of the respective tracing points before the noticed tracing point and judged to be of the same straight line and the smoothing code (c) of the noticed tracing point, and dividing the total sum by the number of the tracing points. The average value difference (e) represents the absolute value of the difference between the average value (d) at the tracing points before the noticed tracing point and the smoothing code (c) at the noticed tracing point. The linear label number (f) intends to form into a group, the tracing points regarded to be the same as a result of the linear judgement, in order to detect the linear component.

Subsequently, a method of detecting linear component "a" in FIG. 3 will be explained with reference to Table 2 referred to above. With respect to the tracing numbers 1 and 2, since part of the data to be smoothed is unknown at this time point, they are to be calculated later when the contour line is in a loop, and neglected when it is not in a loop. Thus, in the first place, a linear label number ① is given to the tracing number 3. Then, a difference between the smoothing code (c) at the tracing number 4 and the average value of the smoothing codes up to the tracing number 3 is obtained, and when the difference is small, the same linear label number ① as that for the tracing number 3 is given. Thereafter, in the similar manner as above, provided that there is not a large difference between the average value of the smoothing code (c) in the same linear label number prior to the noticed point and the smoothing code (c) at the noticed point, the same linear label number (f) is imparted, with the noticed point regarded as the same straight line. Specifically, in the above case, when the difference between the average value (d) and the smoothing code (c) is smaller than 1, it is regarded to be of the same straight line.

At the tracing number 12, since the average value difference is 2.33, thus exceeding 1, another linear label number ② is given and the average value is started to be newly calculated.

If the above result is regarded as the linear component when the number of the same linear label number exceeds a predetermined number, the linear component "a" is to be detected. In the similar manner, the linear component "b" is also detected as the linear label number ⑤.

The tracing numbers (a) and direction codes (b) are similar to those in Table 1, and the smoothing codes (c), average values (d), average value differences (e) and linear label numbers (f) may be calculated in the similar manner as in Table 1, with only change of the subject from the direction codes (b) to the permutational direction codes (h). The directional difference values (g) are obtained from the difference of modulo 8 between the direction code of the noticed tracing point and the direction code of the next tracing point adjacent thereto, and are in the relation as shown in Table 3 below, with respect to the subtraction value of the direction codes.

TABLE 3

| A−B | 7 | 6 | 5 | 3 | 2 | 1 | 0 | −1 | −2 | −3 | −5 | −6 | −7 |
|---|---|---|---|---|---|---|---|---|---|---|---|---|---|
| (g) Directional difference value | −1 | −2 | −3 | 3 | 2 | 1 | 0 | −1 | −2 | −3 | 3 | 2 | 1 |

Remarks: A represents the noticed point direction code, and B denotes the previous point direction code.

It should be noted here that, in the above description, the term "modulo 8" means "the remainder when divided by 8".

More specifically, in the above Table 3, the remainder when the value obtained by subtracting the previous point direction code B from the noticed point direction code A (as shown in the upper column of Table 3) is divided by 8, is given as the directional difference value in the lower column of Table 3.

For example, in the case where A–B is 7, if this is divided by 8, the quotient is 1, with the remainder of −1.

$$8 \overline{\smash{)}\,\underset{\underset{-1 \text{ ---- remainder}}{\underline{8}}}{\overset{1 \text{ ---- quotient}}{7}}}$$

In the case where A–B is 3, the quotient is 0, and the remainder is 3.

$$8 \overline{\smash{)}\,\underset{\underline{0}\ \ 3}{\overset{0}{3}}}$$

When A–B is −5, the quotient is −1, and the remainder is 3.

$$8 \overline{\smash{)}\,\underset{\underline{-8}\ \ 3}{\overset{-1}{-5}}}$$

What is meant thereby is such that, as shown in FIGS. 2(1) to 2(6), there are provided positive or negative values depending on the refracting directions, and sizes of absolute values 1 to 3 depending on the refracting angles. Meanwhile, the permutational direction code (h) has the direction code at the tracing starting point as a starting point, and the permutational direction code of the next tracing point is the value obtained through addition of the directional difference value of the tracing point, while the permutational direction code at the noticed point is obtained by adding the direction difference value to the permutational direction code at the previous point.

It is to be noted here that, in FIGS. 2(1) to 2(6), examples of combinations in which the directional difference values are different are arbitrarily selected in two rows for explanation.

It will be seen that in the method of detecting the linear component by smoothing the permutational direction code as shown in Table 2, the linear component "c" in FIG. 3 is detected as the linear label number ⑧, which could not be effected in the conventional method described earlier with reference to Table 1.

It is to be noted here that the above linear label number ⑧ represents the same group number (label number) showing the linear portion, as that given in the lowest column of Table 2 referred to earlier.

As described above, by effecting smoothing, differentiation, etc., with the permutational direction code employed as the input data, detection of the linear components and corners become possible in any directions, thus reducing the time required for the calculation.

Referring particularly to FIG. 1, there is shown a block diagram of a contour line characteristic point detecting apparatus according to the present invention, in which the above method is realized by hardwares.

In FIG. 1, the contour line characteristic point detecting apparatus generally includes a directional difference value calculating means 1 constituted, for example, by ICL64290 (made by Japan LSI logic K.K.) and connected to an adder 4, a multiplexer 2 also connected to the adder 4 through a delay register 3, with the output of the adder 4 connected to a second input end of the multiplexer 2 and also to a calculation table 5, a high speed digital signal processor 8 (referred to as DSP hereinafter) coupled to the calculation table 5 through a filtering data memory 6, and a counter 7 coupled to said filtering data memory 6 and said DSP 8 as illustrated. The multiplexer 2 is adapted to output the direction code at the tracing starting point as the initial data, and the delay register 3 is arranged to delay the output of the multiplexer 2 by one clock. The adder 4 is intended to add the output from the delay register 3 to the directional difference values successively outputted by the clock. The permutational direction code outputted from the adder 4 is applied to the second input end of the multiplexer 2. To the calculation table 5 (ROM Table), the permutational direction code is inputted directly and through the delay registers 5a in four stages so as to effect calculations such as the smoothing or differentiation. The filtering data memory 6 is to store the results of the calculation outputted from the calculation table 5. The counter 7 is arranged to generate memory addresses for storing in order the calculation results successively outputted. The DSP 8 is intended to access the filtering data memory 6 for effecting the linear judgement, corner judgement, etc.

By the above arrangement, in the first place, the direction code of the tracing starting point is inputted to the multiplexer 2, and is further applied to the adder 4 through one clock delay by the delay register 3. Simultaneously at this time, the directional difference value is calculated by the directional difference value calculating means 1, and applied to the other input terminal of the adder 4. The added data is outputted as the permutational direction code, which is again fed back through the multiplexer 2 as the input data of said adder 4 so as to be added with the next directional difference value. The permutational direction code is inputted as the address data in the calculation table 5 directly and through the four delay registers 5a successively in synchronization with the clock for output of the calculation results such as the smoothing code, etc. For storing in the filtering data memory 6, the input is effected through correction of the delay by the calculation table 5 with the counter 7 which can be preset. The content of the filtering data memory 6 is processed by the DSP 8 to give the average value, average value difference and linear label number, and to detect linear component, etc.

As is seen from the above description, according to this embodiment, calculations such as those for the permutational direction code, and smoothing code for the permutational direction code, etc. may be effected through simple hardwares.

It is to be noted here that, in the foregoing embodiment, although the smoothing code is shown as an example for obtaining the linear component, it may be replaced by a differentiation code when the corner is to be obtained, and in such a case, processing is effected for judgement as the corner point when the differentiation code is above a predetermined value.

It is needless to say that the linear component detection described as effected by the DSP 8 in the foregoing embodiment may be realized by a simple hardware depending on necessity.

As is clear from the foregoing description, according to the present invention, by finding the permutational direction code from the contour line data for input as the address data into the calculation table through the delay register means of any desired number of stages, the linear component detection and corner detection may be effected without depending on directions, with simultaneous reduction of the time required for the calculation. Moreover, since the present invention may be realized by a simple hardware, higher speed and reduction in cost for the detection of objects can be achieved in the "robot-vision", "machine-vision", etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A contour line characteristic point detecting apparatus for processing direction codes of first, second and third contour line tracing points, said apparatus comprising:

means for obtaining a directional difference value which is a difference between the direction code of the second contour line tracing point and the direction code of the third contour line tracing point which is adjacent to the second contour line tracing point, means for obtaining a permutational direction code by adding said directional difference value to the direction code of the first contour line tracing point, means for obtaining a resultant permutational direction code by adding a subsequent directional difference value calculated with respect to a subsequent contour line tracing point and a previous contour line tracing point, to the permutational direction code, a delay register means for delaying the permutational direction code successively obtained, by a desired number of stages, and a calculation table for receiving data from respective stages of the delay register means as address data, and for using said address data to detect at least one of a linear component and a corner.

2. The apparatus of claim 1, further comprising means for obtaining a subsequent resultant permutational direction code by adding the subsequent directional difference value calculated with respect to the subsequent contour line tracing point and the previous contour line tracing point, to the resultant permutational direction code.

* * * * *